Figures 1, 2:
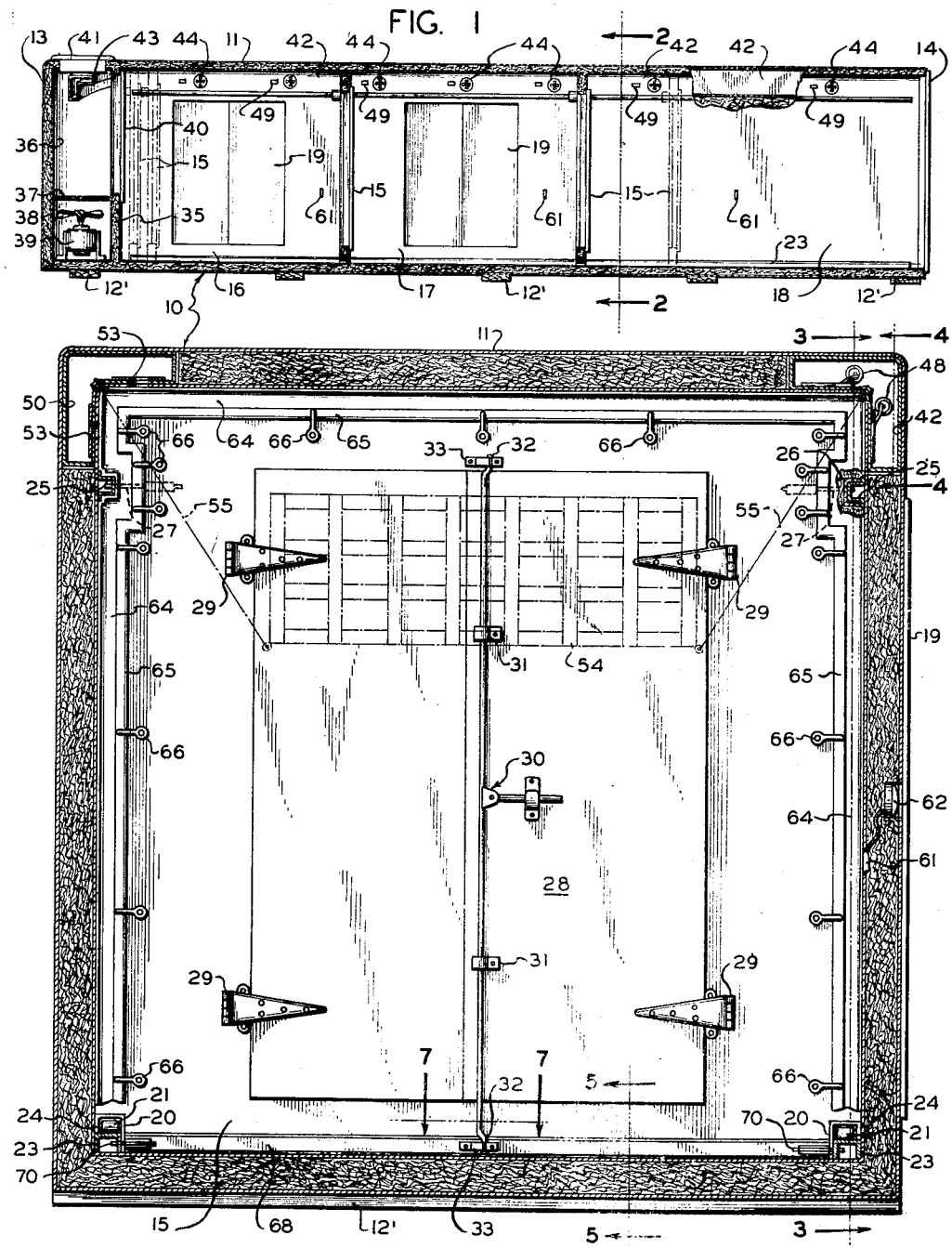

May 4, 1954   J. P. WEHBY   2,677,244
VARIABLE COMPARTMENT VEHICLE
Filed Sept. 1, 1949   3 Sheets-Sheet 1

INVENTOR.
J. P. WEHBY
BY
A. Yates Dowell
ATTORNEY

May 4, 1954
J. P. WEHBY
2,677,244
VARIABLE COMPARTMENT VEHICLE
Filed Sept. 1, 1949
3 Sheets-Sheet 2
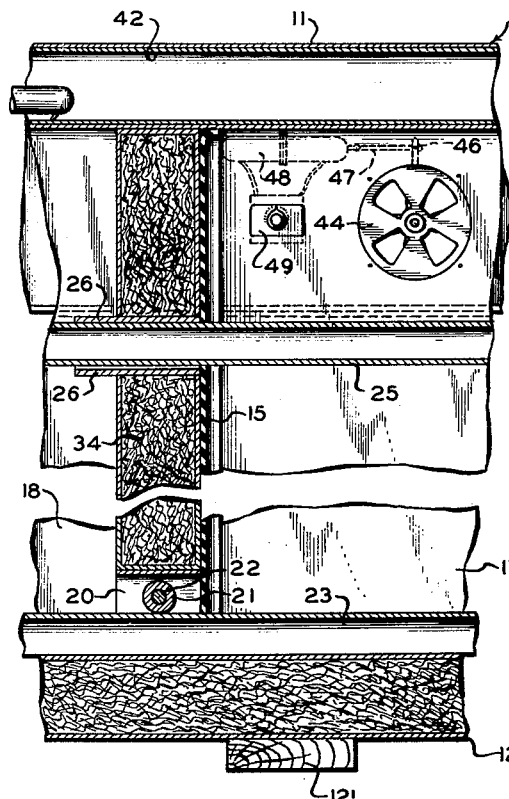
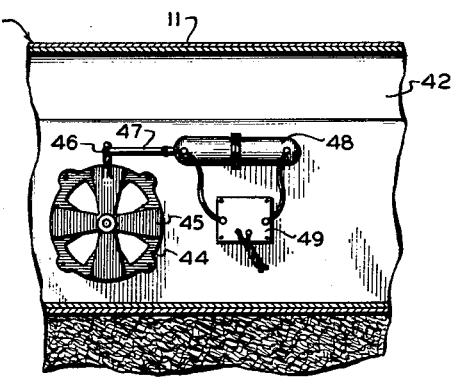
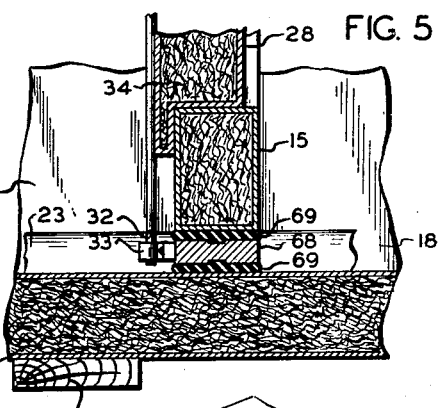
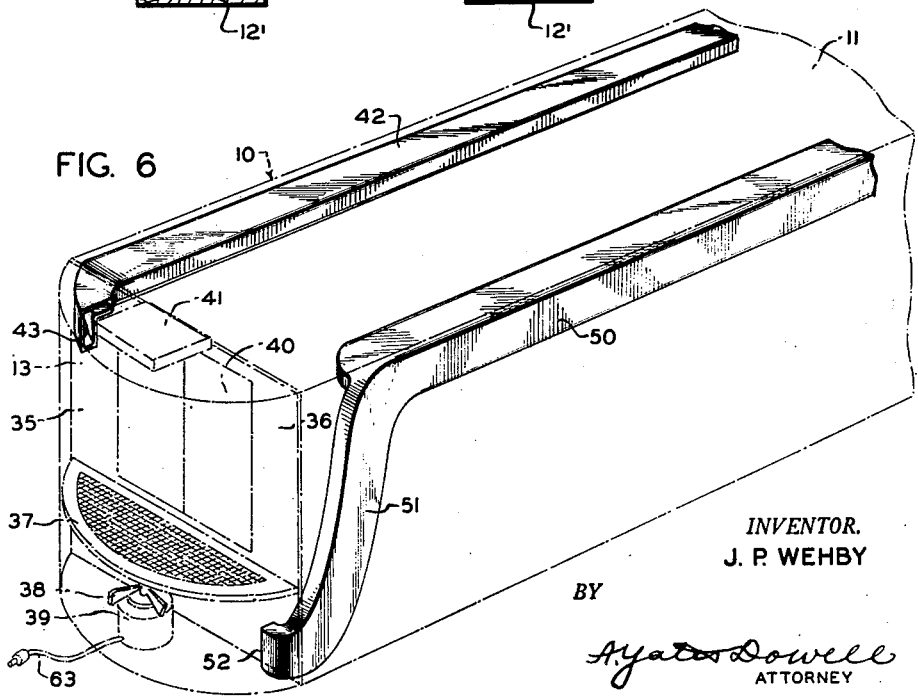
INVENTOR.
J. P. WEHBY
BY
A. Yates Dowell
ATTORNEY May 4, 1954 J. P. WEHBY 2,677,244
VARIABLE COMPARTMENT VEHICLE
Filed Sept. 1, 1949 3 Sheets-Sheet 3
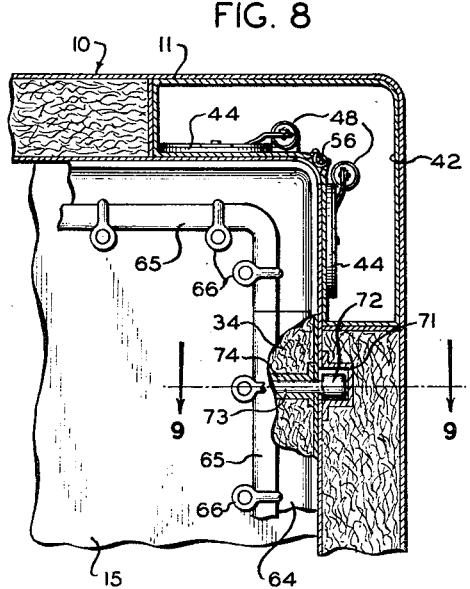
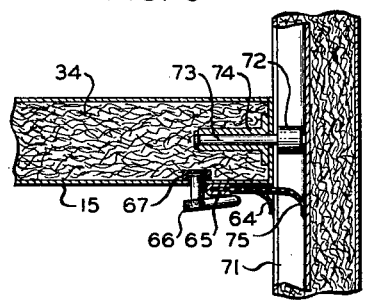
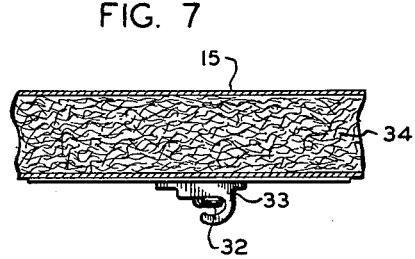
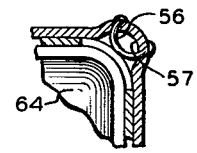
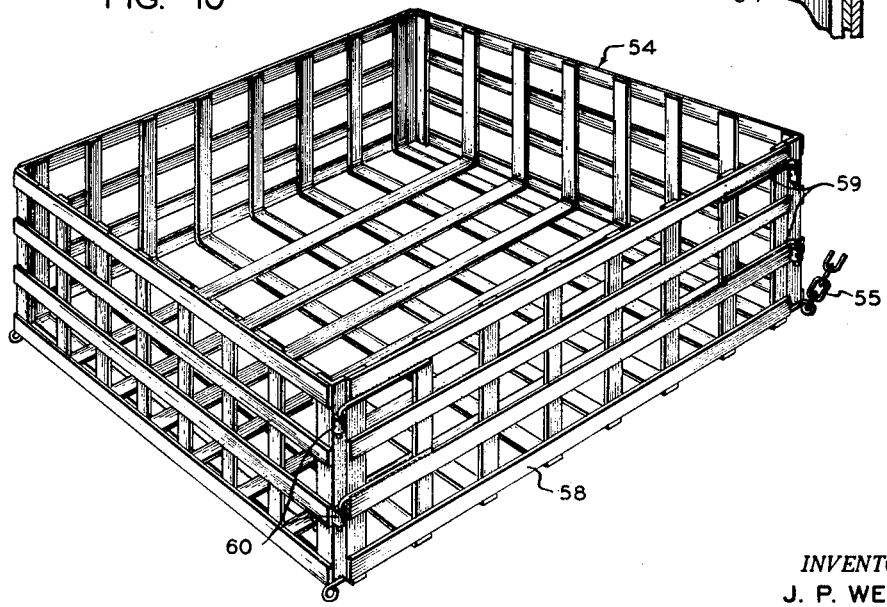
INVENTOR.
J. P. WEHBY
BY
ATTORNEY Patented May 4, 1954

2,677,244

UNITED STATES PATENT OFFICE 2,677,244

VARIABLE COMPARTMENT VEHICLE

Jack P. Wehby, Nashville, Tenn.

Application September 1, 1949, Serial No. 113,659

10 Claims. (Cl. 62—6)

This invention relates to the moving of commodities and more particularly to the method of transporting the same and to the equipment by which such transportation is accomplished.

In the transportation of commodities of greatly different characters numerous types of equipment have been employed and varying processes have been utilized in the operation of such equipment. Certain commodities typified by characteristics of a more or less perishable nature have required extremely careful, closely watched handling, while others have needed a substantially lesser degree of care. For example, certain commodities have been of a variety that could not be easily injured by physical contact or by extremes of temperature or humidity, while others have been particularly susceptible to damage through handling or by sudden changes in temperature or atmospheric conditions. The present application is a continuation-in-part of a co-pending application, Serial No. 109,149, filed August 8, 1949, now Patent No. 2,633,714, for a compartmentalized vehicle especially designed for the handling and transportation of commodities of varying characters.

It is accordingly an object of the invention to provide transportation equipment and a method of use thereof whereby all types of commodities may be more readily, economically, satisfactorily, and efficiently stored and moved.

It is a further object of the invention to provide compartmentalized transportation equipment or facilities with means for controlling conditions of temperature and humidity in one compartment or area of the equipment without identical control or, if desired, without any control of such conditions in other compartments or areas, so that products requiring refrigeration and humidity control can be transported simultaneously with other products or commodities not requiring such control, and in which the controlled area need only be sufficiently extensive for the commodities requiring the same.

It is a further object of the invention to provide compartmentalized equipment or facilities where the several compartments may be selectively controlled and where access may be had to each compartment independently of the others.

It is a still further object of the present invention to provide compartmentalized transportation facilities where the size of each compartment may be varied as required, in accordance with the nature and quantity of the commodities to be handled therein, within the physical limits of the facility.

It is a further object of the invention to provide compartmentalized transportation equipment provided with means for the selective and controlled delivery of cooled or refrigerated air to any or all of the compartments thereof, in accordance with the character and requirements of the commodities to be retained or transported therein.

It is a still further object of the present invention to provide novel means for receiving and supporting a refrigerating medium in adjustable relationship with respect to the articles or commodities requiring temperature control.

Further objects and advantages of the invention will be apparent from the following specification, taken in connection with the accompanying drawings, wherein:

Fig. 1 is a longitudinal sectional view disclosing for purposes of illustration a transportation facility body provided with three compartments;

Fig. 2, a transverse sectional view through the transportation facility body on a somewhat enlarged scale, taken on the line 2—2 of Fig. 1, illustrating one of the movable partitions utilized to compartmentalize the facility and disclosing a container for a refrigerant medium in dotted lines;

Fig. 3, a vertical sectional view taken on the line 3—3 of Fig. 2, parts being broken away, illustrating the supporting means for one of the partitions and a vent in an air carrying duct;

Fig. 4, a detail section view taken on the line 4—4 of Fig. 2, illustrating the automatic vent controlling mechanism;

Fig. 5, a detail sectional view taken on the line 5—5 of Fig. 2, illustrating the sealing means utilized between the lower edge of one of the movable partitions and the floor of the facility body, to prevent the passage of air therebetween;

Fig. 6, a perspective view of the forward portions of the air-carrying ducts, the transportation facility body being indicated somewhat diagrammatically in dotted lines;

Fig. 7, a detail sectional view taken on the line 7—7 of Fig. 2, illustrating the locking means for the sealing member utilized between the lower edge of one of the movable partitions and the floor of the facility body, to prevent the passage of air therebetween;

Fig. 8, a detail sectional view disclosing the upper portion of one of the partitions and the surrounding transportation facility body, illustrating a modified form of support for said partition;

Fig. 9, a detail sectional view taken on the line 9—9 of Fig. 8, illustrating the modified supporting means of Fig. 8 and the sealing means designed to prevent passage of air around the adjacent edge of the partition;

Fig. 10, an enlarged perspective view of a container for a refrigerating medium; and, Fig. 11, a fragmentary detail view of wall structure designed to support a container for a refrigerant medium.

Briefly stated, the invention contemplates the provision of a transportation facility body having a plurality of compartments each of which is readily adjustable as to size. The facility may be a truck or trailer body or a railroad freight car, or any related piece of transportation equipment. Side doors are provided for curb or railroad siding loading or unloading, and a preferred embodiment of the structure also includes rear or end doors. Each compartment is adapted to be refrigerated, or not, as desired. For this purpose the facility is provided with closed space, preferably adjacent one extremity thereof, adapted to receive and retain therein a refrigerating medium such as Dry Ice or the like and an air duct or ducts are provided leading from said closed space or refrigerant compartment and communicating with the interior of the transportation facility body. Suitable spaced vents positioned in the air duct or ducts, with automatic control thereof in accordance with the required or desired conditions of temperature and humidity, permit selective distribution of appropriately refrigerated air to any or all of the several compartments of the transportation facility body.

As an alternative or supplementary means for refrigerating any portion or the entire interior of the facility body, baskets or other receptacles may be provided adapted to receive and support therein a suitable refrigerating medium such as Dry Ice, or the like. Such receptacles may be supported from the roof of the facility and the supporting means therefor is preferably vertically adjustable to permit the positioning of the refrigerating medium as close to the commodities being retained or transported as the nature and characteristics thereof require. Since the partitions which separate the several compartments are movable to control the size thereof, the refrigerant supporting means or receptacles utilized must also be readily movable, longitudinally of the facility, in accordance with the required positioning of the partitions. Further, each partition is preferably provided with a door or doors to permit convenient passage between adjacent compartments, without consideration to the relation of the position of the partition to the nearest side door of the facility.

With continued reference to the drawing, the transportation facility may be in the form of a trailer body 10 having a roof 11 and floor 12 supported upon suitable sills 12', or the like. The body 10 preferably includes a curved or arcuate front end wall 13 and the usual rear door or doors 14. It will be understood, however, that the arcuate front end illustrated forms no particular part of the present invention and any other type of transportation equipment may be as readily employed, such as a truck, railroad car, or the like, provided with end doors at one or both ends thereof, as may be desired. A plurality of spaced and movable insulated partitions 15 are provided, but two being illustrated, for forming compartments of the desired dimensions within the body of the transportation facility. Any suitable motive means, not shown, may be utilized.

As illustrated more particularly in Fig. 1 of the drawings, the provision of two movable partitions 15 provides compartments 16, 17, and 18 of desired dimensions insofar as the length of such compartments is concerned, within the trailer body 10. Access to these compartments may be had through conveniently located doors. With these partitions positioned substantially as illustrated, access to the two forward compartments 16 and 17 may be had through identical doors 19 provided in a side wall of the trailer body and adapted to be secured in closed position by any suitable form of locking mechanism or latches, not shown. The rear compartment 18 may likewise have a side door or doors for providing access thereto, however, rear doors indicated at 14 have been found more practical since doors of this character leave the rear compartment of the trailer body entirely unobstructed, thus facilitating the loading and unloading thereof. Suitable mechanism is provided, not shown, for securing the rear doors 14 in closed position.

To permit of the variation of the lengths of the several compartments, in accordance with the requirements, nature or quantity of commodity to be placed therein, the partitions 15 are movable longitudinally of the trailer or facility body, any desired means being employable to provide for such adjustable movement. Preferably each partition 15 comprises a suitable metallic insulated frame including top, bottom, and side members of integral or otherwise rigid construction. Each extremity of the bottom member of the partition 15 is recessed for the reception of a substantially U-shaped guide member 20 which is securely retained in position by any suitable means such as welding, or the like, and rollers 21, journalled upon shafts 22, are carried within said guide members. Longitudinally disposed rails or tracks 23, paralleling the side walls of the body and preferably disposed immediately adjacent thereto, are mounted upon the floor 12 of the body, and the rollers 21 are adapted to engage said tracks. The tracks 23 may be secured to side walls and floor by any desired means, such as rivets, bolts, welding, or the like. From an examination of Fig. 2 of the drawings, it will be apparent that each guide member 20 includes a depending leg 24 which abuts the adjacent free face of the track 23 and thus prevents any possibility of displacement of the partition, the rollers 21 serving to eliminate any substantial friction and insuring the free and easy movement of the partitions to desired positions.

To further support the partitions 15 the side walls of the body are provided with longitudinally disposed tracks or rails 25, positioned a convenient distance from the roof 11 of the body. These side rails 25 are secured in position by any suitable means, such as rivets, bolts, welding, or the like and the side members of the partition frames are suitably recessed for the reception of preferably U-shaped guide members 26 which embrace the rails 25 and thus support a portion of the weight of the partition, relieving the burden of the rollers 21. It will be readily apparent, from an examination of Figs. 2 and 3 of the drawings, that the upper legs of the guides 26 ride upon the upper, horizontally disposed surfaces of the rails 25. Preferably the guide members project beyond the partitions, on one side thereof, to provide an extended and more secure supporting or bearing surface.

Any desired means may be provided for securely locking or retaining the partitions 15 in desired adjusted position and preventing accidental movement thereof. Such means has been illustrated as horizontally disposed sliding bolts 27 mounted upon the side members of the partition framework in alignment with the guide members 26 and adapted to project therethrough, being receivable within suitable apertures spaced along the vertical walls of the rails 25.

Preferably each partition 15 is provided with a door or doors 28 hingedly mounted within the partition framework as indicated at 29 whereby access within the trailer body may be had between the several compartments, suitable locking means 30 being provided for maintaining such doors secured. Preferably such locking means comprises a vertically disposed bolt or rod, rotatably journalled within suitable bearings 31 and provided with offset extremities 32, for a purpose to be hereinafter more fully described, receivable within suitable keepers 33. Each partition door 28 is insulated as indicated at 34 to permit of the ready maintenance of varying conditions of temperature and humidity in adjacent compartments. Roof, floor, and side walls of the body are similarly insulated, as are the rear doors 14 and the partition frames.

A compartmentalized facility of the character described permits the side by side transportation in a single vehicle of a plurality of commodities of varying characteristics which may require different conditions of temperature and humidity. If desired, commodities for which definite conditions of temperature and humidity are essential may be carried in one compartment while products having different characteristics could be placed in other compartments where temperature and other conditions would not be identically controlled. For example, where three compartments are provided, frozen products could be carried in one compartment at a relatively low or subfreezing temperature while commodities such as fruit, eggs, or the like, which cannot withstand subfreezing temperatures, may be carried in another of the compartments which would be maintained at a temperature above the freezing point. At the same time other commodities which are not readily affected by normal conditions of temperature and humidity, such as canned goods, potatoes, flour, and numerous articles other than food products, may be conveniently carried in the remaining compartment.

Preferably the front end of the transportation facility body is closed off as by an insulated wall or partition 35 to provide an appropriate space 36 for the housing of suitable refrigerating mechanism or the retention of a refrigerating medium, such as Dry Ice or the like, together with means for distributing cold air, when required, to the interior of the facility body. A preferred embodiment of such an arrangement is disclosed as comprising a horizontally disposed supporting grill or the like 37 extending across the space or compartment 36. Air distributing means, such as a fan 38 intended to be driven by a suitable electric motor 39, is mounted within suitable brackets or frame structure upon the floor of the body, beneath the grill 37. The wall 35 is preferably provided with a suitably insulated door or doors 40 so that access may be had to the interior of the closed off space 36 for the purpose of positioning appropriate refrigerant medium upon the grill 37. Suitable locking means, not shown, is provided for the door or doors 40. If desired, the roof 11 of the facility body may be provided with an insulated closure 41, in the nature of a trap-door, providing access to the interior of the closed space 36 from the exterior of the body. Upon removal of the closure member 41, refrigerant medium may be deposited upon the grill 37, thus avoiding any necessity for entering the body 10, with possible disturbance of commodities placed therein, to service the refrigerant containing space 36 or replenish the contents thereof. Suitable locking means, also not shown, is provided for the closure member 41.

Air duct means is provided for conveying refrigerated air from the refrigerating compartment 36 to the interior of the body 10. A preferred embodiment of such means has been illustrated as an L-shaped duct 42 positioned for space conserving purposes within the insulated walls of the body at a corner thereof where side wall and roof meet. Obviously a plurality of ducts may be provided, positioned longitudinally of the body as desired, and of any suitable cross-sectional configuration. The open forward end 43 of the duct communicates with the refrigerating compartment 36 at a point adjacent the upper level thereof, while the opposite extremity of the duct terminates adjacent the rear end of the body 10 and is preferably closed. Spaced vents 44 are provided throughout the length of the duct, communicating with the interior of the body, and these vents may be alternately positioned in the roof and side wall thereof.

Any suitable type of automatically controllable closure means is provided for each vent 44, a preferred embodiment thereof being illustrated as a shutter or valve member 45 pivotally mounted as at 46 and provided with a plurality of blades or vanes corresponding in number to the number of apertures comprising each vent. A link 47 connects each shutter to electrical control means illustrated as a solenoid 48 provided with appropriate electrical conductors leading to a suitable source of electrical energy, not shown. A thermostat or the like 49, adapted for manual operation, is associated with each vent whereby automatic control of the temperature within the transportation facility body 10, or any compartment thereof, may be conveniently had. It will be readily apparent that each thermostat may be appropriately adjusted to the temperature desired within the compartment or portion of the facility body with which said vent communicates and that when said conditions of temperature reach the appropriate level the solenoid 48, or solenoids as the case may be, will be deenergized closing the vents thus affected. In like manner, any increase in temperature above the setting of the thermostat will result in the energization of the solenoid 48, opening the valve member 45, as is well-known in this particular art.

To permit of relatively continuous air circulation within the facility body 10, a return air duct 50 is provided, also preferably of L-shaped cross-sectional configuration, positioned within an opposite corner of the facility body, at the meeting corner of roof and side wall. As will be more readily apparent from an examination of Fig. 6 of the drawings, the duct 50 includes a downwardly depending portion 51 provided with an open forward extremity 52 communicating with the refrigerating compartment 36 at a point adjacent the floor thereof and beneath the grill 37 upon which the refrigerating medium is intended to be supported. The return air duct 50 is provided with a plurality of vents 53 spaced throughout the length thereof and communicating with the interior of the facility body, as more particularly illustrated in Fig. 2 of the drawings. These vents, like the inlet vents 44, may be alternately positioned in the roof and side wall of the body 10 where an L-shaped vent provides legs communicating with both.

Thus refrigerated air will be forced from the top of the refrigerating compartment 36, by the action of the fan 38, into the cold air duct 42, through the open extremity 43 thereof. Such refrigerated air will be conveyed to the interior of the facility body 10 generally, or to selected portions of compartments thereof, through the inlet vents 44, whereby localized conditions of temperature may be maintained in strict accordance with the specific requirements and locations of commodities positioned within said body. Since the body is relatively air tight, the doors thereof being substantially sealed when in closed position, air will be returned to the refrigerating compartment 36 through the return duct 50, to again be cooled by passage over the refrigerant medium and recirculated in the above described manner.

When required, all compartments or the entire interior of the body 10 may be maintained and operated under controlled conditions particularly of temperature and humidity. For certain or special commodities requiring unusually low temperatures for proper maintenance, additional refrigerant or refrigerating means may be provided. For this purpose open-mesh baskets or the like 54 may be supported by chains 55 suspended from suitable hooks or hangers 56. Recesses 57 are spaced in the side walls of the body adjacent the roof thereof and the hangers 56 are adapted to engage within said recesses. Thus the baskets, intended to receive a suitable refrigerating medium such as Dry Ice or the like, may be moved longitudinally of the transportation facility body in accordance with the positioning of the partitions 15 as well as the location of specific commodities within the several compartments. Further, the chains, or suspension means for said baskets, may be readily adjustable so as to permit variation in the height of said baskets and refrigerant in accordance with the height or quantity of commodity being refrigerated thereby.

Preferably each basket 54 includes a removable end 58, also of open mesh construction to permit ready passage of air therethrough, provided with a plurality of substantially L-shaped brackets 59 or the like, welded or otherwise secured thereto, and adapted for engagement within suitable keepers or eyes 60, welded or otherwise secured to opposed corner posts of the basket, as will be more readily apparent from an examination of Fig. 10 of the drawings. Vertical upward movement of the end member 58 will disengage the brackets 59 from the keepers 60 permitting complete removal of this end member, thus providing free access to the interior of the basket for the purpose of placing or removing a refrigerant medium. Baskets constructed in this novel manner have been found to be particularly convenient for use in the manner described above.

It will be readily understood from the foregoing that the present invention provides a transportation facility body of widely flexible use in which the number of compartments and the size of each, as well as the conditions of temperature and humidity under which each compartment is maintained, may be varied in accordance with the commodities transported as well as climatic conditions en route. If but only a single compartment is required, all partitions 15 may be moved to a position adjacent one end wall of the body, as illustrated in dotted lines in Fig. 1 of the drawing. If but two compartments are indicated as being advantageous, one partition 15 might be moved to a position against an end wall while the other partition, where only two partitions are employed, might be moved to some desired intermediate position, as also illustrated in dotted lines in Fig. 1. A refrigerant and moisture modifying medium may also be carried in each compartment, or in as many thereof as is advisable or desirable. Conditions of humidity within the respective compartments may be modified in any desired manner as by the atomization of water by conventional means, the utilization of a suitable drying agent, or other means as is well known in this art.

Visual indicators may be provided for disclosing temperature conditions within the body 10, or any of the compartments thereof. A preferred embodiment of such indicating means is disclosed as a plurality of temperature indicators 61 of any suitable type spaced along a side wall of the body and having dials 62 or other recording means associated therewith and visible exteriorly of the facility body. The readings on such dials will be an accurate reflection of the temperature conditions within the body 10 without any necessity for disturbing said body or the commodities placed therein.

While the electric motor of the fan 38 and the thermostats and solenoids of the air duct vents are intended to be operated by the storage battery or electric power plant of the facility or vehicle itself, it will be understood that when the body 10 remains at rest over an appreciable period of time and continued refrigeration control is required, any external source of electrical energy, not shown, may be employed. For this purpose the body 10 may be provided with an electrical conductor 63, indicated in dotted lines in Fig. 6 of the drawings, intended for connection with any suitable electrical outlet, and having appropriate electrical connection with the fan motor 39 and the electrical system of the facility body.

To prevent interchange of air between the several compartments, when the doors in the partitions 15 are closed, suitable sealing means are provided to prevent passage of air between the walls of the body 10 and the periphery of each partition 15. A preferred embodiment of such sealing means has been disclosed as flaps 64, of rubber, leather, or other suitable material, secured to one face of the top and side members of the frame of each partition. Such flaps are preferably formed of three sections, one for the top and one for each side, the flexible material being secured within a substantially rigid U-shaped frame member 65. Suitable locking members or dogs 66 are provided, journalled for oscillatory or rotative movement within appropriate bearings 67 fixedly mounted within the framework of the partitions 15. The dogs 66 lock the sealing flaps in position upon the partitions 15, with the free edges of the flaps 64 in frictional engagement with the adjacent walls of the facility body.

The sealing means for the lower edge of each partition 15 may comprise a bar or the like 68, of any suitable material and having resilient strips 69 of rubber or the like mounted on the upper and lower faces thereof. Preferably bar 68 and associated resilient strips 69 are slightly tapered transversely thereof and are of a length substantially equal to the distance between the opposed inner faces of the floor tracks 23 and of a height substantially equal to the distance between the lower edge of the partition 15 and the floor 12. A keeper 33 for the locking rod 30 of the partition doors 28 is mounted upon a vertical face of the locking bar 68, as is more fully disclosed in Fig. 2 of the drawings. When the locking bar is rotated to locked position, the offset lower extremity 32 thereof will engage within the keeper 33 and by reason of the transverse taper of the locking bar and resilient strips, said bar will be drawn or forced into secure sealing engagement between the floor of the body 10 and the bottom edge of the partition 15.

Locking means are provided for maintaining the bar 68 in sealed position and preventing accidental or other displacement thereof. Such means has been illustrated as horizontally disposed sliding bolts 70 mounted upon the locking bar 68 and receivable within suitable spaced apertures provided in the vertical walls of the floor tracks 23.

Efficient closure and sealing means are thus provided, as between the walls of the transportation facility body and the frames of the partitions 15, whereby unauthorized passage of air from one compartment to another is substantially prevented.

There has been illustrated in Figs. 8 and 9 of the drawings, a modified form of side supporting rails for the partitions 15. In such modified form the side walls of the body 10 are recessed for the reception of longitudinal tracks 71, provided in lieu of the side rails 25. Rollers 72, mounted upon stub shafts or spindles 73 suitably journalled within bearings 74 provided in the partitions 15, engage within the tracks 71 and assist in supporting the partitions in a substantially frictionless manner to permit the particularly ready movement or adjustment thereof.

With this modified form of support it becomes unnecessary to offset the sealing flaps so as to embrace the side rails 25, however, the side flaps are provided with enlarged tongue portions 75 which enter into the side tracks 71, frictionally engaging all three walls thereof and substantially preventing unauthorized passage of air between compartments through the passage that such tracks would otherwise provide.

There has thus been described a transportation facility body which may be compartmentalized, if desired, through the employment of longitudinally reciprocable partitions whereby the lengths of the several compartments may be conveniently adjusted in accordance with the nature or quantity of the commodity intended to be carried therein. Conditions of temperature and humidity in each compartment may be separately controlled and products requiring widely varying degrees of such control may be transported in a single vehicle body.

It will be obvious to those skilled in this art that various changes may be made in the invention without departing from the spirit and scope thereof and therefore this invention is not limited by that which is shown in the drawing or described in the specification but only as indicated in the appended claims.

What is claimed is:

1. A transportation facility comprising a body including top, bottom, side and end walls, doors in one of said side and end walls affording access to the interior of said body, movable partitions dividing said body into a plurality of compartments, doors in said partitions affording access therethrough, locking means for said doors, longitudinal track members supported upon said bottom wall, track engaging members mounted upon said partitions, rollers journalled in said track engaging members engaging said tracks and permitting ready movement of said partitions longitudinally of said body to vary the lengths of said compartments, opposed longitudinal side track members supported in said side walls, U-shaped track engaging members mounted upon said partitions and adapted to embrace said side track members, locking means mounted upon said partitions and adapted to engage within apertures provided in said side track members for securing said partitions in position, a closed refrigerating compartment adjacent one extremity of said body, means providing access to said refrigeration compartment interiorly of said body, means providing access to said refrigerating compartment exteriorly of said body, an L-shaped duct disposed longitudinally of said body within a side and top wall thereof and communicating with said refrigerating compartment, means within said refrigerating compartment for forcing refrigerated air through said duct, said duct being provided with spaced vents communicating with the compartments in said body, automatic means for selectively controlling said vents, a second longitudinal L-shaped duct disposed within the opposed side wall and top of said body and provided with vents communicating with the compartments in said body for returning air from said body to said refrigerating compartment, flexible sealing flaps secured to said partitions and engaging the top and side wall surfaces of said body to prevent passage of air about the sides and top of said partitions, a sealing bar disposed beneath each partition to prevent passage of air therebeneath, a keeper on said sealing bar adapted to be engaged by the partition door locking means for locking said sealing bar in sealed position, and means for providing control of conditions of temperature and humidity in each of said compartments.

2. A transportation facility comprising a body including top, bottom, side and end walls, doors in one of said side and end walls affording access to the interior of said body, movable partitions dividing said body into a plurality of compartments, doors in said partitions affording access therethrough, longitudinal track members supported upon said bottom wall, track engaging members mounted upon said partitions, rollers journalled in said track engaging members engaging said tracks and permitting ready movement of said partitions longitudinally of said body to vary the lengths of said compartments, opposed longitudinal side track members supported in said side walls, U-shaped track engaging members mounted upon said partitions and adapted to embrace said side track members, locking means mounted upon said partitions and adapted to engage within apertures provided in said side track members for securing said partitions in position, a refrigerating compartment adjacent one extremity of said body, refrigeration means disposed within said refrigerating compartment, an air duct disposed longitudinally of said body and communicating with said refrigerating compartment, means within said refrigerating compartment for forcing refrigerated air through said duct, spaced vents in said duct providing communication with the compartments in said body, automatic means for selectively controlling said vents, a second longitudinal duct provided with vents communicating with the compartments in said body for returning air from said body to said refrigerating compartment, flexible sealing flaps secured to said partitions and engaging the top and side wall surfaces of said body to prevent passage of air about the sides and top of said partitions, a sealing bar disposed beneath each partition to prevent passage of air therebeneath, locking means on the partition doors associated with said sealing bar for locking the bar in sealed position, movable refrigeration means within said body arranged for independent refrigeration of said compartments, and means for providing control of conditions of temperature and humidity in each of said compartments.

3. A transportation facility comprising a body including top, bottom, side and end walls, doors in said walls affording access to the interior of said body, movable partitions dividing said body into a plurality of compartments, doors in said partitions affording access therethrough, longitudinally disposed track members in said body, track engaging members mounted upon said partitions engaging said track members and permitting ready movement of said partitions to vary the lengths of said compartments, a closed refrigerating compartment adjacent one extremity of said body, doors providing access to said refrigerating compartment, an air duct disposed longitudinally of said body and communicating with said refrigerating compartment, said duct being provided with a plurality of spaced vents communicating with said compartments, automatic means for selectively controlling said vents, means within said refrigerating compartment for forcing refrigerated air through said air duct, a second longitudinal duct disposed within said body and provided with a plurality of spaced vents for returning air from said body to said refrigerating compartment, flexible sealing flaps secured to said partitions and engaging the top and side wall surfaces of said body to prevent passage of air about the top and sides of said partitions, sealing bars disposed beneath said partitions to prevent passage of air therebeneath, locking means upon said partitions adapted to engage opposed track members for locking said partitions in position, locking means upon the partition doors engaging the associated sealing bars for locking said bars in sealed position, and means for providing control of conditions of temperature and humidity in each of said compartments.

4. A transportation facility comprising a vehicle body including top, bottom, side and end walls, doors in one of said side and end walls affording access to the interior of said body, movable partitions dividing said body into a plurality of compartments, doors in said partitions affording access therethrough, longitudinal track members supported in said top and side walls, U-shaped track engaging members mounted upon said partitions and adapted to embrace said track members, rollers journalled in said track engaging members permitting ready movement of said partitions longitudinally of said body to vary the lengths of said compartments, locking means mounted upon said partitions and adapted to engage within apertures provided in said track members for securing said partitions in position, refrigeration means within said body arranged for independent refrigeration of said compartments, flexible sealing flaps secured to each of said partitions and engaging the adjacent top and side wall surfaces of said body to prevent passage of air around the top and sides of said partitions, sealing means disposed beneath said partitions to prevent passage of air therebeneath, and means for providing control of conditions of temperature and humidity in each of said compartments.

5. A transportation facility comprising a vehicle body including top, bottom, side and end walls, doors in said side and end walls affording access to the interior of said body, movable partitions dividing said body into a plurality of compartments, doors in said partitions affording access therethrough, longitudinal track members supported in said top and side walls, U-shaped track engaging members mounted upon said partitions and adapted to engage said track members, rollers journalled in said track engaging members permitting ready movement of said partitions longitudinally of said body to vary the lengths of said compartments, locking means mounted upon said partitions and adapted to be received within apertures provided in the track members supported in the bottom wall of said body for securing said partitions in position, refrigeration means within said body arranged for independent refrigeration of said compartments, means carried by said partitions for preventing passage of air around the peripheries thereof, and means for providing control of conditions of temperature and humidity in each of said compartments.

6. A transportation facility comprising a vehicle body including top, bottom, side, and end walls, doors in said side and end walls affording access to the interior of said body, movable partitions dividing said body into a plurality of compartments, means carried by said partitions for preventing passage of air around the peripheries thereof, the doors in the side and end walls of the body being so located as to permit independent access to said compartments, doors in said partitions affording access therethrough, longitudinal track members supported in said top and side walls, U-shaped track engaging members mounted upon said partitions and adapted to engage said track members, rollers journalled in said track engaging members permitting ready movement of said partitions longitudinally of said body to vary the lengths of said compartments, refrigeration means within said body arranged for independent refrigeration of said compartments, and means for providing selective control of conditions of temperature and humidity in each of said compartments.

7. A transportation facility comprising a vehicle body including top, bottom, side, and end walls, movable partitions dividing said body into a plurality of compartments, means carried by said partitions for preventing passage of air around the peripheries thereof, the doors in the side and end walls of the body being so located as to permit independent access to said compartments, longitudinal track members supported in said top and side walls, track engaging members mounted upon said movable partitions, rollers journalled in said track engaging members permitting ready movement of said partitions longitudinally of said body to vary the lengths of said compartments, doors in said side and end walls affording access to the interior of said body, doors in said partitions for affording access therethrough, refrigeration means within said body arranged for independent refrigeration of said compartments, and means for providing independent control of temperature and humidity conditions in each of said compartments.

8. A transportation facility comprising a vehicle body including top, bottom, side, and end walls, partitions dividing said body into a plurality of compartments, means carried by said partitions for preventing passage of air around the peripheries thereof, the doors in the side and end walls of the body being so located as to permit independent access to said compartments, longitudinal track members supported in said top and side walls, track engaging members mounted upon said movable partitions permitting ready movement of said partitions longitudinally of said body to vary the lengths of said compartments, doors in said side and end walls affording access to the interior of said body, doors in said partitions affording access therethrough, refrigeration means within said body arranged for independent refrigeration of said compartments, and means for providing selective control of temperature and humidity conditions in each of said compartments.

9. A transportation facility body including top, bottom, side and end walls, doors in one of said side and end walls affording access to the interior of said body, a closed refrigerating compartment in said body, doors providing access to said refrigerating compartment interiorly of said body, a door providing access to said refrigerating compartment exteriorly of said body, transverse partitions movable within the body dividing said body into a plurality of compartments, longitudinal tracks members in said body supporting said partitions, an air duct within said body communicating with said refrigerating compartment and provided with a plurality of spaced vents communicating with said compartments, means within said refrigerating compartment for forcing refrigerated air through said air duct, a second air duct within said body for returning air to said refrigerating compartment, sealing means for preventing interchange of air between said compartments, and means for providing selective independent control of conditions of temperature and humidity within said compartments.

10. A transportation facility comprising a body including top, bottom, side and end walls, doors in one of said side and end walls affording access to the interior of said body, movable partitions dividing said body into a plurality of compartments, doors in said partitions affording access therethrough, longitudinal track members supported upon said bottom wall, track engaging members mounted upon said partitions, rollers journalled in said track engaging members engaging said tracks and permitting ready movement of said partitions longitudinally of said body to vary the lengths of said compartments, opposed longitudinal side track members supported in said side walls, U-shaped track engaging members mounted upon said partitions and adapted to embrace said side track members, locking means mounted upon said partitions and adapted to engage within apertures provided in said side track members for securing said partitions in position, a refrigerating compartment adjacent one extremity of said body, refrigeration means disposed within said refrigerating compartment, an air duct disposed longitudinally of said body and communicating with said refrigerating compartment, means within said refrigerating compartment for forcing refrigerated air through said duct, spaced vents in said duct providing communication with the compartments in said body, automatic means for selectively controlling said vents, a second longitudinal duct provided with vents communicating with the compartments in said body for returning air from said body to said refrigerating compartment, flexible sealing flaps secured to said partitions and engaging the top and side wall surfaces of said body to prevent passage of air about the sides and top of said partitions, a sealing bar disposed beneath each partition to prevent passage of air therebeneath, locking means on the partition doors associated with said sealing bar for locking the bar in sealed position, movable refrigeration means within said body arranged for independent refrigeration of said compartments, and means for providing control of conditions of temperature and humidity in each of said compartments said movable refrigeration means comprising open mesh containers adapted to contain a refrigerant medium, supporting means for suspending said containers within said compartments, and means for adjusting said supporting means to vary the vertical disposition of said containers.

References Cited in the file of this patent

UNITED STATES PATENTS

| Number | Name | Date |
|---|---|---|
| 281,421 | Wight | July 17, 1883 |
| 1,341,744 | Hatch | June 1, 1920 |
| 1,670,187 | Browne | May 15, 1928 |
| 1,726,071 | Howlett | Aug. 27, 1929 |
| 1,833,034 | Parker | Nov. 24, 1931 |
| 1,839,210 | Felts et al. | Jan. 5, 1932 |
| 1,844,822 | Rowledge | Feb. 9, 1932 |
| 2,005,086 | Jones | June 18, 1935 |
| 2,155,463 | Angell | Apr. 25, 1939 |
| 2,203,814 | Clements | June 11, 1940 |
| 2,207,678 | Gilpin | July 9, 1940 |
| 2,220,436 | Ziegler | Nov. 5, 1940 |
| 2,251,376 | Ross | Aug. 5, 1941 |
| 2,266,986 | Murphy | Dec. 23, 1941 |
| 2,314,463 | Schwebs | Mar. 23, 1943 |
| 2,466,994 | Martin | Apr. 12, 1949 |
| 2,479,128 | Maniscalo | Aug. 16, 1949 |
| 2,517,823 | Angell | Aug. 8, 1950 |
| 2,523,957 | Kleist | Sept. 26, 1950 |
| 2,534,272 | Kleist | Dec. 19, 1950 |
| 2,559,304 | Lundvall | July 3, 1951 |
| 2,633,714 | Wehby | Apr. 7, 1953 |

FOREIGN PATENTS

| Number | Country | Date |
|---|---|---|
| 279,754 | Great Britain | Nov. 3, 1927 |